United States Patent [19]

Gergen et al.

[11] Patent Number: 4,866,128
[45] Date of Patent: Sep. 12, 1989

[54] POLYMER BLEND

[75] Inventors: William P. Gergen, Houston, Tex.;
Robert G. Lutz, Santa Rosa, Calif.

[73] Assignee: Shell Oil Company, Houston, Tex.

[21] Appl. No.: 203,959

[22] Filed: Jun. 8, 1988

[51] Int. Cl.$^4$ ....................... C08L 23/00; C08L 53/02
[52] U.S. Cl. ......................................... 525/92; 525/93; 525/185
[58] Field of Search ..................... 525/92, 185, 93, 95, 525/98

[56] References Cited

U.S. PATENT DOCUMENTS

| | | | |
|---|---|---|---|
| Re. 27,145 | 6/1971 | Jones . | |
| 2,495,286 | 1/1950 | Brubaker | 260/63 |
| 3,595,942 | 7/1971 | Wald et al. . | |
| 3,694,412 | 9/1972 | Nozaki | 260/63 |
| 4,107,130 | 8/1978 | Gergen et al. | 525/95 |
| 4,111,895 | 9/1978 | Gergen et al. . | |
| 4,536,542 | 8/1985 | Allen | 525/92 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 222454 | 5/1987 | European Pat. Off. . |
| 1081304 | 8/1967 | United Kingdom . |

*Primary Examiner*—Allan M. Lieberman
*Attorney, Agent, or Firm*—Dean F. Vance

[57] ABSTRACT

Polymer blends of improved properties comprise a uniform blend of (1) a linear alternating polymer of carbon monoxide and at least one ethylenically unsaturated hydrocarbon and (2) a selectively hydrogenated block copolymer of a vinyl aromatic compound and a conjugated alkadiene.

8 Claims, No Drawings

POLYMER BLEND

FIELD OF THE INVENTION

This invention relates to improved polymer blends comprising a major proportion of a linear alternating polymer of carbon monoxide and at least one ethylenically unsaturated hydrocarbon. More particularly it relates to blends of the linear alternating polymer with a hydrogenated block copolymer.

BACKGROUND OF THE INVENTION

The class of polymers of carbon monoxide and olefin(s) has been known for a number of years. Brubaker, U.S. Pat. No. 2,495,286 produced such polymers of relatively low carbon monoxide content in the presence of free radical initiators, e.g., peroxy compounds. U.K. Pat. No. 1,081,304 produced similar polymers of higher carbon monoxide content in the presence of alkylphosphine complexes of palladium salts as catalyst. Nozaki extended the process to produce linear alternating polymers through the use of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. These polymers, often referred to as polyketones or polyketone polymers, have been shown to be of the repeating structure —CO—(A)— where A is the moiety of ethylenically unsaturated hydrocarbon polymerized through the ethylenic unsaturation. For example, when the hydrocarbon is ethylene, the polymer is represented by the repeating formula —CO$(CH_2$—$CH_2)$. The general process for the production of such polymers is illustrated by a number of published European Patent Applications including 0,121,965 and 0,181,014. The process generally involves the use of a catalyst composition formed from a compound of palladium, cobalt or nickel, the anion of a non-hydrohalogenic acid having a pKa below 2 and a bidentate ligand of phosphorus, arsenic or antimony.

The resulting polymers are relatively high molecular weight thermoplastics having utility in the production of shaped articles such as containers for food and drink and shaped parts for the automotive industry. For some particular applications it has been found to be desirable to have properties for a polymeric composition which are somewhat different from those of the polyketone polymer. It would be of advantage to retain the more desirable properties of the polyketone and yet improve other properties. These advantages are often obtained through the provision of a polymer blend.

SUMMARY OF THE INVENTION

This invention contemplates the provision of blends of linear alternating polymer of carbon monoxide and at least one ethylenically unsaturated hydrocarbon with other polymeric material. More particularly, there is provided according to the invention a blend of the linear alternating polymer with a hydrogenated block copolymer of a vinyl aromatic compound and a conjugated alkadiene. Such blends demonstrate improved impact strength.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons which are useful as precursors of the polyketones have up to 20 carbon atoms inclusive, preferably up to 10 carbon atoms inclusive, and are aliphatic such as ethylene and other α-olefins including propylene, 1-butene, isobutylene, 1-octene and 1-dodecene, or are arylaliphatic containing an aryl substituent on a carbon atom of an otherwise aliphatic molecule, particularly an aryl substituent on a carbon atom of the ethylenic unsaturation. Illustrative of this latter class of ethylenically unsaturated hydrocarbons is styrene, p-methylstyrene, p-ethylstyrene and m-methylstyrene. Preferred polyketones are copolymers of carbon monoxide and ethylene or terpolymers of carbon monoxide, ethylene and a second hydrocarbon of at least 3 carbon atoms, particularly an α-olefin such as propylene.

The structure of the polyketone polymers is that of a linear alternating polymer of carbon monoxide and ethylenically unsaturated hydrocarbon and the polymer will contain substantially one molecule of carbon monoxide for each molecule of hydrocarbon. When terpolymers of carbon monoxide, ethylene and a second hydrocarbon are employed in the blends of the invention there will be within the terpolymer at least two units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain is therefore represented by the formula

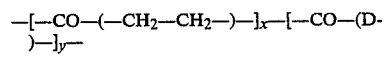

where D is the moiety obtained by polymerization of the second hydrocarbon through the ethylene unsaturation. The —CO—(—CH$_2$—CH$_2$—)— units and the —CO—(D)— units are found randomly throughout the polymer chain and the ratio of y:x is no more than about 0.5. In the modification where copolymers of carbon monoxide and ethylene are employed, the second hydrocarbon will not be present in the polyketone polymer chain and such copolymers are represented by the above formula wherein y=0. When y is other than 0, as in the case of terpolymers, ratios of y:x from about 0.01 to about 0.1 are preferred. The end groups or "caps" of the polymer chain will depend on what materials are present during the production of the polymer and whether and how the polymer has been purified. The precise nature of the end groups is of little significance so far as the overall properties of the polymer are concerned so that the polyketone polymer is fairly represented by the above formula. Of particular interest are the polymers of a number average molecular weight from about 1,000 to about 200,000, and particularly those polymers of molecular weight from about 20,000 to about 90,000 as determined by gel permeation chromatography (GPC). The physical properties of such polymers depend in part on whether the polymer is a copolymer or a terpolymer and the relative proportion of the second hydrocarbon present in the case of terpolymers. Typical melting points of such polymers are from about 175° C. to about 300° C., more frequently from about 210° C. to about 270° C.

A method of producing the polyketone polymers which is now becoming conventional is to contact the carbon monoxide and hydrocarbon(s) in the presence of a catalyst composition formed from a palladium compound, the anion of a non-hydrohalogenic acid having a pKa below about 6 and a bidentate ligand of phosphorus. Such a process is illustrated by co-pending U.S. patent application, Ser. No. 930,468 filed Nov. 14, 1986 (Docket No. K-0722). The scope of the process of polyketone production is extensive. Without wishing to be limited, a preferred palladium compound is a palladium carboxylate, particularly palladium acetate, a preferred anion is the anion of trifluoroacetic acid or p-toluenesulfonic acid and the preferred bidentate ligand is 1,3-bis(diphenylphosphine)propane or 1,3-bis[di(2-methoxyphenyl)phosphino]propane.

Polymerization is conducted under polymerization conditions in the gaseous phase or in a liquid phase in the presence of an inert diluent such as methanol or ethanol. The reactants are contacted by conventional means as by shaking or stirring. Suitable reaction temperatures are from about 20° C. to about 150° C. with preferred temperatures being from about 50° C. to about 150° C. Typical reaction pressures are from about 1 bar to about 200 bar, more typically from about 10 bar to about 100 bar. The polymer product is recovered as by filtration or decantation. The polyketone polymer may contain residues of the catalyst which are removed if desired by contacting the polymer with a solvent or complexing agent which is selective for the residues.

The hydrogenated block copolymer employed as the minor polymeric component of the blends of the invention comprises a class of polymeric material well known in the art. The hydrogenated block copolymer has at least two blocks, designated A, of a polymerized vinyl aromatic compound and at least one block, designated B, of a substantially completely hydrogenated polymerized conjugated alkadiene. The hydrogenated block copolymer has from about 8% by weight to about 55% by weight, preferably from about 10% by weight to about 30% by weight, of the polymerized vinyl aromatic compound blocks A with the remainder being substantially completely hydrogenated polymerized alkadiene block B. Each of such A blocks will have an average molecular weight of from about 5,000 to about 125,000, preferably from about 7,000 to about 60,000. Each B block will have an average molecular weight of from about 10,000 to about 300,000, preferably from about 30,000 to about 150,000.

The hydrogenated block copolymer is produced by substantially completely hydrogenation of the aliphatic unsaturation of the B block while very little of the aromatic unsaturation of the A blocks is effected. Such selective hydrogenation is conventional.

The block copolymer precursor of the hydrogenated block copolymer is also well known in the art and is produced by conventional methods. The block copolymer is produced in geometric forms referred to as linear, branched and radial, and block copolymer of each of these types is satisfactory as a precursor of the hydrogenated block copolymer used in the blends of the invention. Preferred methods of production of the block copolymers involve the use of a lithium polymerization initiator, particularly a lithium alkyl. U.S. Pat. No. 3,595,942 describes block copolymers and methods of their production. Linear block copolymers are typically produced by sequential addition of suitable monomers into a polymerization reactor in the presence of the lithium alkyl initiator. The living polymer chain grows through sequential polymerization. Linear block copolymers are also illustratively produced by coupling of two living polymer chains with a difunctional coupling agent such as a dihaloalkane. Branched block copolymer structures are obtained through coupling of living polymer chains with a coupling agent having a functionality of three or more. Use of a coupling agent such as a silicon tetrahalide which is symmetrical around a central structural point will lead to polymers having a structure termed radial. Use of such a coupling agent which is non-symmetrical results in block polymer of a structure termed branched. The precise nature of any coupling agent does not contribute substantially to the properties of the block copolymer and may be ignored so far as a description of the polymers is concerned. Even the coupled block copolymers are fairly described in terms of the blocks A and B.

The A blocks are produced by polymerization of a vinyl aromatic compound such as styrene or analogs or styrene such as $\alpha$-methylstyrene or ring methylated styrenes including p-methylstyrene and o-methylstyrene. The preferred vinyl aromatic compounds are styrene and $\alpha$-methylstyrene and particularly preferred is styrene.

A precursor B block is preferably a homopolymeric block of butadiene or isoprene but copolymers with a vinyl aromatic compound are also suitable so long as the B block is predominantly conjugated alkadiene units. A particularly preferred non-hydrogenated B block is homopolymeric butadiene. In the case of butadiene, polymerization to give polymer units having a 1,2-structure or a 1,4-structure is possible. Preferred B blocks produced from butadiene have from about 35% to about 55% of units having a 1,2-structure with the remainder being units of a 1,4-structure.

Illustrative of the block copolymer precursors of the hydrogenated block copolymer blend components are block copolymers of the following types:
  polystyrene-polybutadiene-polystyrene (SBS)
  polystyrene-polyisoprene-polystyrene (SIS)
  poly($\alpha$-methylstyrene)polybutadiene-poly($\alpha$-methylstyrene)
  poly($\alpha$-methylstyrene)polyisoprene-poly($\alpha$-methylstyrene).

Hydrogenation of the block copolymer is effected in conventional manner by use of a catalyst formed by reaction of an aluminum alkyl with a nickel or cobalt carboxylate or alkoxide which serves to partially or selectively hydrogenate the block copolymer in that at least 80% of the aliphatic unsaturation is hydrogenated while hydrogenating no more than about 25% of the aromatic unsaturation. Preferably at least 99% of the aliphatic carbon-carbon double bonds while less than 5% of the aromatic unsaturation is hydrogenated. As stated, such selective hydrogenation is now conventional and is also illustrated by U.S. Pat. No. 3,595,942 as well as by U.S. Pat. No. Re 27,145. For a general description of block copolymers and their production before and after hydrogenation, see U.S. Pat. No. 4,111,895.

The hydrogenated block copolymers will have average molecular weights on the order of from about 25,000 to about 350,000. Preferred hydrogenated block copolymers have a molecular weight from about 35,000 to about 300,000. Such hydrogenated block copolymers are commercial and are sold by Shell Chemical Company under the tradename KRATON® G Thermoplastic Rubber.

The blends of the invention are predominantly polyketone with a lesser proportion of the hydrogenated block copolymer. The precise quantity of the block copolymer to be employed in the blends is not critical and percentages from about 0.5% by weight to about 45% by weight, based on total blend, are satisfactory. Better results are generally obtained when quantities of hydrogenated block copolymer from about 1% by weight to about 20% by weight, some basis, are employed.

The method of producing the blend of polyketone and hydrogenated block copolymer is not material so long as a substantially uniform blend of polyketone and hydrogenated block copolymer is obtained without undue degradation of the polymer components or the resulting blend. Conventional methods are satisfactory. In one modification, the polymer components are blended in a corotating twin screw extruder. In an alternate modification, the polymer components are blended in a mixing device which exhibits high shear.

The polyketone polymer/hydrogenated block copolymer blend is a non-miscible blend having properties improved over those of the polyketone polymer. The hydrogenated block copolymer exists as a discrete phase in the polyketone matrix with a phase size on the order of from about 0.3 micron to about 1.5 micron, more generally on the order of about 0.7 micron. This infers good interfacial adhesion between the dispersed hydrogenated block copolymer phase and the continuous polyketone phase. The blends are not homogeneous, of course, but good properties are obtained when the dispersed phase is present uniformly throughout the continuous phase.

The blends of the invention may also include conventional additives such as antioxidants and stabilizers, fillers and flame retardant materials, mold release agents, colorants and other materials which serve to increase the processability of the polymers or improve the properties of the resulting blend. Such additives are added by conventional methods prior to, together with or subsequent to the blending of the polyketone and hydrogenated block copolymer.

The blends demonstrate improved impact resistance. The blends are of particular utility where molded parts are desired which require impact resistance when subjected to their normal usage. The polyketone/hydrogenated block copolymer blends are processed by conventional methods such as extrusion and injection molding into sheets, films, plates and molded articles. Illustrative of blend applications are the production of both internal and external parts for automotive applications and structural parts for use in the construction industry.

The invention is further illustrated by the following Illustrative Embodiments which should not be construed as limiting.

ILLUSTRATIVE EMBODIMENT I

A linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. The melting point of the polymer (087/002) was 220° C. and the polymer had a limiting viscosity number (LVN) of 1.29 (measured at 60° C. in m-cresol).

ILLUSTRATIVE EMBODIMENT II

A blend of the polyketone polymer of Illustrative Embodiment I and 10% by weight based on total blend a hydrogenated block copolymer characterized as a polymer of the SEBS type and having a molecular weight of about 57,000 and 32% styrene was produced by passing the polymeric components through a 30 mm Haake extruder operating at 270° C. under $N_2$ with dried feed. The resulting blend was uniform. A cold cut sample of the blend, stained with ruthenium tetroxide, was examined under an electron microscope. The hydrogenated block copolymer was present as a discrete phase having a phase diameter of about 0.7 microns.

Small plates of this blend were produced by compression molding and examined by a center notched Izod impact testing technique. The values obtained for the polyketone polymer used in the blend and also for the blend are shown in Table I.

TABLE I

| Material | Izod (J/M) | |
|---|---|---|
| | RT-Izod | (−20° C.) |
| Polyketone | 94 | 47 |
| Blend | 164 | 73 |

What is claimed is:

1. A composition comprising a non-miscible blend of a linear alternating polymer of carbon monoxide and at least one ethylenically unsaturated hydrocarbon having up to 20 carbon atoms and from about 0.5% by weight to about 45% by weight, based on total blend, of a block copolymer of a vinyl aromatic compound and at least a partially hydrogenated conjugated alkadiene wherein said block copolymer comprises at least two blocks of the vinyl aromatic compound, each of which blocks is of molecular weight from about 5,000 to about 150,000, and at least one block of the conjugated alkadiene, wherein the conjugated alkadiene is substantially completely hydrogenated and positioned between two blocks of the vinyl aromatic compound.

2. The composition of claim 1 wherein the linear alternating polymer is represented by the formula

wherein D is the moiety of an ethylenically unsaturated hydrocarbon of at least 3 carbon atoms and the ratio of y:x is no more than about 0.5.

3. The composition of claim 2 wherein the vinyl aromatic compound is styrene or α-methylstyrene and the alkadiene is butadiene or isoprene, and the block copolymer is present in a quantity of from about 0.5% by weight to about 35% by weight, based on total blend.

4. The composition of claim 3 wherein y=0.

5. The composition of claim 3 wherein D is a moiety of propylene and the ratio of y:x is from about 0.01 to about 0.1.

6. The composition of claim 1, wherein the amount of the block copolymer is from about 1 to about 20% by weight.

7. The composition of claim 6, wherein the amount of the block copolymer is about 10% by weight.

8. The composition of claim 1 wherein the weight percentage of the vinyl aromatic compound blocks in said block copolymer is about 8% to about 55% by weight.

* * * * *